(12) United States Patent
Zhu et al.

(10) Patent No.: US 12,146,447 B1
(45) Date of Patent: Nov. 19, 2024

(54) MULTIMODE ENGINES WITH ADVANCED VALVETRAIN SYSTEMS AND METHODS OF USE

(71) Applicants: Hyundai Motor Company, Seoul (KR); Kia Corporation, Seoul (KR)

(72) Inventors: Shengrong Zhu, Ann Arbor, MI (US); Kyoung Pyo Ha, Gyeonggi-do (KR); Mark Shirley, Albion, MI (US); Ankith Ullal, Superior Township, MI (US); Nam Kyun Kang, Superior Township, MI (US); Jeffrey Hollowell, Commerce, MI (US); Nicholas Fantin, Ann Arbor, MI (US); Vincent Costanzo, Superior Township, MI (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/365,596

(22) Filed: Aug. 4, 2023

(51) Int. Cl.
*F02D 13/02* (2006.01)
*F02P 5/04* (2006.01)

(52) U.S. Cl.
CPC .......... *F02D 13/0265* (2013.01); *F02P 5/045* (2013.01); *F02D 2200/1006* (2013.01); *F02D 2200/1012* (2013.01); *F02D 2250/21* (2013.01)

(58) Field of Classification Search
CPC ......... F02D 13/0265; F02D 2200/1006; F02D 2200/1012; F02D 2250/21; F02D 2041/001; F02D 41/3035; F02D 41/3041; F02P 5/045; Y02T 10/12; F01L 2800/00–19
See application file for complete search history.

(56) References Cited

U.S. PATENT DOCUMENTS

| | | | |
|---|---|---|---|
| 7,240,659 B2 | 7/2007 | Yang | |
| 7,748,355 B2 | 7/2010 | Megli et al. | |
| 8,886,422 B2 | 11/2014 | Sujan et al. | |
| 10,550,790 B2 | 2/2020 | Ravi et al. | |
| 2009/0048760 A1* | 2/2009 | Chen | F02D 41/3035 123/295 |
| 2016/0186681 A1* | 6/2016 | Ravi | F02D 41/3076 701/115 |
| 2019/0178115 A1 | 6/2019 | Son et al. | |
| 2022/0260030 A1* | 8/2022 | Yun | F02D 41/403 |

FOREIGN PATENT DOCUMENTS

WO 2009/023388 A1 2/2009

* cited by examiner

*Primary Examiner* — Loren C Edwards
(74) *Attorney, Agent, or Firm* — Fox Rothschild LLP (57) ABSTRACT

Systems and methods for improving engine low load performance are provided. The method may comprise performing a negative valve overlap (NVO) mode of operation, using an early exhaust valve closing (EVC) timing that is earlier than the intake valve opening timing and creates an NVO during a gas exchange top dead center, to compress in-cylinder gas and increase overall gas temperature for improved fuel vaporization, mixing, and reforming before the fuel-air mixture is burnt. With NVO operation, a low temperature combustion (LTC) mode may be used to improve engine combustion efficiency and reduce emissions. With the NVO operation at low loads, the engine intake may be wide open or less throttled, reducing pumping loss. A method based on a rate of change in the engine speed and load for the combustion mode transition between spark ignition (SI) and LTC modes is provided.

8 Claims, 6 Drawing Sheets

MULTIMODE ENGINES WITH ADVANCED VALVETRAIN SYSTEMS AND METHODS OF USE

BACKGROUND

Technical Field

Embodiments of the present disclosure relate to systems and methods for improving engine low load performance.

Background

In the EPA Federal Test Procedure (FTP)-75 drive cycle, vehicles are often operated at low loads, where engine efficiency is low.

For spark ignition (SI) combustion engines, flow restriction from throttling (i.e., pumping loss, and then a slow combustion rate) is a main reason for low efficiency at low loads. Low temperature combustion (LTC) or homogenous charged compression ignition (HCCI) has significantly improved fuel economy and reduced emissions at low loads as compare to SI combustion engines.

LTC can be operated with a throttle fully opened (versus being partially closed with SI combustion), reducing pumping loss, and can be operated with a fast combustion rate (versus a slow combustion rate with SI combustion), increasing combustion thermal efficiency. An example comparison of combustion performance between SI combustion engines and LTC engines is shown in Table 1.

TABLE 1

| 1500 rpm/2.6 bar BMEP | LTC vs. SI |
|---|---|
| Pumping Loss (PMEP/BMEP) | Δ −19% |
| Burn Duration | Δ −53% |
| Brake Thermal Efficiency | Δ +17% |
| Emissions | NOx: Δ −99% |
|  | THC: Δ −10% |
|  | CO: Δ 0% |

However, it is challenging to have a controllable LTC in production engines.

External exhaust gas recirculation (EGR) may be used to reduce the throttling requirement of the engine for lower pumping loss. However, too much external EGR can cause combustion instability issues.

Cylinder deactivation technology (or dynamic skip fire) may be used in order to cause some cylinders (e.g., 2 out of 4) to operate at a relatively higher load. However, this may result in potential torque oscillation issues. Some mitigation measures are needed, e.g., a passive or active device such as flywheel dampers and electric motors.

Variable valve timing and lift may be used for higher intake pressure at low loads in order to reduce pumping loss. However, operation range is limited due to the lift control coupled with the valve timing.

A variable compression ratio may be implemented in order to have a higher compression ratio at low loads in order to increase combustion thermal efficiency. However, even with implementing the variable compression ratio, the pumping loss still remains.

Lean stratified combustion may be used by creating a rich mixture around a spark plug and a lean mixture in the periphery. However, in order to implement this, a different aftertreatment system, other than a three-way catalyst (TWC) system, is needed, and, while implementing the lean stratified combustion, pumping loss is still high resulted from throttling.

Multimode combustion may be implemented with SI and HCCI by using multiple fuel injections to create staged combustion. However, with this form of multimode combustion, a complicated fueling strategy is needed and it poses some challenges to the fueling system.

Multimode combustion may be implemented with SI and HCCI by using variable valve timing and duration for intake or/and exhaust. However, with this form of multimode combustion, mode transition speed is limited.

Therefore, for at least these reasons, systems and methods for improving engine low load performance is needed.

SUMMARY

According to an object of the present disclosure, a method of improving engine low load performance is provided. The method may comprise performing a negative valve overlap (NVO) mode of operation, using an early exhaust valve closing (EVC) timing that creates an NVO during a gas exchange top dead center, to compress in-cylinder gas and increase overall gas temperature for improved fuel vaporization, mixing, and reforming before the fuel-air mixture is burnt. The method may comprise, when a rate of change (ROC) is less than or equal to a predefined ROC ($ROC_{max}$) transitioning from a spark ignition (SI) mode to a low temperature combustion (LTC)-spark assisted (SA) mode, or transitioning from the LTC-SA mode to the SI mode.

According to an exemplary embodiment, the transitioning from the SI mode to the LTC-SA mode may comprise, when at a low limit of LTC operation, simultaneously and gradually increasing the NVO until an approximately wide-open-throttle (WOT) is achieved, and adjusting a spark timing and fueling strategy.

According to an exemplary embodiment, the transitioning from the LTC-SA mode to the SI mode may comprise, when at an upper limit of LTC operation, reducing the NVO gradually to a proper cam setting for the SI operation, increasing a boost as needed, and adjusting a spark timing and fueling strategy.

According to an exemplary embodiment, the transitioning from the SI mode to the LTC-SA mode may comprise, when at an upper limit of LTC operation, gradually increasing the NVO until an LTC-SA mode condition is achieved, reducing a boost as needed, and adjusting a spark timing and fueling strategy.

According to an exemplary embodiment, the transitioning from the LTC-SA mode to the SI mode may comprise, when at a low limit of LTC operation, simultaneously and gradually decreasing the NVO and close a throttle until an SI condition is met, and adjusting a spark timing and fueling strategy.

According to an exemplary embodiment, the method may further comprise, when the ROC is greater than the $ROC_{max}$, when in the SI mode, adjusting a throttle and boost, and adjusting a spark timing and fueling strategy.

According to an exemplary embodiment, the method may further comprise, when the ROC is greater than the $ROC_{max}$, when in the SI mode, adjusting the engine speed and load by maintaining in the SI mode, and then transitioning to the LTC-SA mode by increasing the NVO to an NVO value suitable for use with the LTC-SA mode, when a throttle is not fully open, simultaneously opening up the throttle until an approximately wide-open-throttle (WOT) is achieved, and adjusting a spark timing and fueling strategy.

According to an exemplary embodiment, the method may further comprise, when the ROC is greater than the $ROC_{max}$, when in the LTC-SA mode, decreasing the NVO until an SI condition is reached, adjusting the engine speed and load, and then increasing the NVO to an NVO value suitable for use with the LTC-SA mode, when a throttle is not fully open, simultaneously opening up the throttle until an approximately wide-open-throttle (WOT) is achieved, and adjusting a spark timing and fueling strategy.

According to an exemplary embodiment, the method may further comprise, when the ROC is greater than the $ROC_{max}$, when in the LTC-SA mode, transitioning to the SI mode by decreasing the NVO until a minimum NVO or an SI condition is reached, adjusting a throttle and boost, and adjusting a spark timing and fueling strategy.

According to an object of the present disclosure, an internal combustion engine system is provided. The system may comprise an engine chamber with a piston, one or more of the following, configured to enable a negative valve overlap (NVO) mode of operation in which an intake valve opening (IVO) timing is later than an exhaust valve closing (EVC) timing: a continuously variable valve duration (CVVD) mechanism for both an intake valve and an exhaust valve; a dual CVVD and continuously variable valve timing (CVVT) mechanism for both the intake valve and the exhaust valve; and a cam system. The system may further comprise a fuel delivery system comprising one or more of the following: a direct injector; and a port fuel injector. The system may further comprise an ignition system and an engine controller configured to control one or more functions of the internal combustion engine system. The one or more functions may comprise performing the NVO mode of operation, using the EVC timing that creates an NVO during a gas exchange top dead center, to compress in-cylinder gas and increase overall gas temperature for improved fuel vaporization, mixing, and reforming before the fuel-air mixture is burnt, and, when a rate of change (ROC) is less than or equal to a predefined ROC ($ROC_{max}$), transitioning from a spark ignition (SI) mode to a low temperature combustion (LTC)-spark assisted (SA) mode, or transitioning from the LTC-SA mode to the SI mode.

According to an exemplary embodiment, the transitioning from the SI mode to the LTC-SA mode may comprise, when at a low limit of LTC operation, simultaneously and gradually increasing the NVO until an approximately wide-open-throttle (WOT) is achieved, and adjusting a spark timing and fueling strategy.

According to an exemplary embodiment, the transitioning from the LTC-SA mode to the SI mode may comprise, when at an upper limit of LTC operation, reducing the NVO gradually to a proper cam setting for the SI operation, increasing a boost as needed, and adjusting a spark timing and fueling strategy.

According to an exemplary embodiment, the transitioning from the SI mode to the LTC-SA mode may comprise, when at an upper limit of LTC operation, gradually increasing the NVO until an LTC-SA condition is achieved, reducing a boost as needed, and adjusting a spark timing and fueling strategy.

According to an exemplary embodiment, the transitioning from the LTC-SA mode to the SI mode may comprise, when at a low limit of LTC operation, simultaneously and gradually decreasing the NVO and close a throttle until an SI condition is met, and adjusting a spark timing and fueling strategy.

According to an exemplary embodiment, the one or more functions may comprise, when the ROC is greater than the $ROC_{max}$, when in the SI mode, adjusting a throttle and boost and adjusting a spark timing and fueling strategy.

According to an exemplary embodiment, the one or more functions may comprise, when the ROC is greater than the $ROC_{max}$, when in the SI mode, adjusting the engine speed and load by maintaining in the SI mode, and then transitioning to the LTC-SA mode by increasing the NVO to an NVO value suitable for use with the LTC-SA mode, when a throttle is not fully open, simultaneously opening up the throttle until an approximately wide-open-throttle (WOT) is achieved, and adjusting a spark timing and fueling strategy.

According to an exemplary embodiment, the one or more functions may comprise, when the ROC is greater than the $ROC_{max}$, when in the LTC-SA mode, decreasing the NVO until a minimum NVO is reached, adjusting the engine speed and load, and then increasing the NVO to an NVO value suitable for use with the LTC-SA mode, when a throttle is not fully open, simultaneously opening up the throttle until an approximately wide-open-throttle (WOT) is achieved, and adjusting a spark timing and fueling strategy.

According to an exemplary embodiment, the one or more functions may comprise, when the ROC is greater than the $ROC_{max}$, when in the LTC-SA mode, transitioning to the SI mode by decreasing the NVO until a minimum NVO or a proper cam setting for the SI mode is reached, adjusting a throttle and boost, and adjusting a spark timing and fueling strategy.

According to an exemplary embodiment, the engine controller may comprise a computing device, comprising a processor and a memory, configured to store programming instructions that, when executed by the processor, causes the processor to perform the one or more functions of the internal combustion engine system.

According to an object of the present disclosure, a vehicle comprising the internal combustion engine system is provided.

BRIEF DESCRIPTION OF THE DRAWINGS

The accompanying drawings, which are incorporated in and form a part of the Detailed Description, illustrate various non-limiting and non-exhaustive embodiments of the subject matter and, together with the Detailed Description, serve to explain principles of the subject matter discussed below. Unless specifically noted, the drawings referred to in this Brief Description of Drawings should be understood as not being drawn to scale and like reference numerals refer to like parts throughout the various figures unless otherwise specified.

DETAILED DESCRIPTION

The following Detailed Description is merely provided by way of example and not of limitation. Furthermore, there is no intention to be bound by any expressed or implied theory presented in the preceding background or in the following Detailed Description.

Reference will now be made in detail to various exemplary embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications, and equivalents, which may be included within the spirit and scope of the various embodiments as defined by the appended claims. Furthermore, in this Detailed Description, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Some portions of the detailed descriptions which follow are presented in terms of procedures, logic blocks, processing, and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities may take the form of electrical or magnetic signals capable of being stored, transferred, combined, compared, and otherwise manipulated in an electronic system, device, and/or component.

It should be borne in mind, however, that these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "determining," "communicating," "taking," "comparing," "monitoring." "calibrating," "estimating," "initiating," "providing." "receiving," "controlling," "transmitting," "isolating," "generating," "aligning," "synchronizing," "identifying," "maintaining," "displaying," "switching," or the like, refer to the actions and processes of an electronic item such as: a processor, a sensor processing unit (SPU), a processor of a sensor processing unit, an application processor of an electronic device/system, or the like, or a combination thereof. The item manipulates and transforms data represented as physical (electronic and/or magnetic) quantities within the registers and memories into other data similarly represented as physical quantities within memories or registers or other such information storage, transmission, processing, or display components.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. In aspects, a vehicle may comprise an internal combustion engine system as disclosed herein.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example device vibration sensing system and/or electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As employed in the subject specification, the term "processor" can refer to substantially any computing processing unit or device comprising, but not limited to comprising, single-core processors; single-processors with software multithread execution capability; multi-core processors, multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration. One or more components of an SPU or electronic device described herein may be embodied in the form of one or more of a "chip," a "package," an Integrated Circuit (IC).

Embodiments described herein provide systems and methods for improving engine low load performance.

Figure 1:
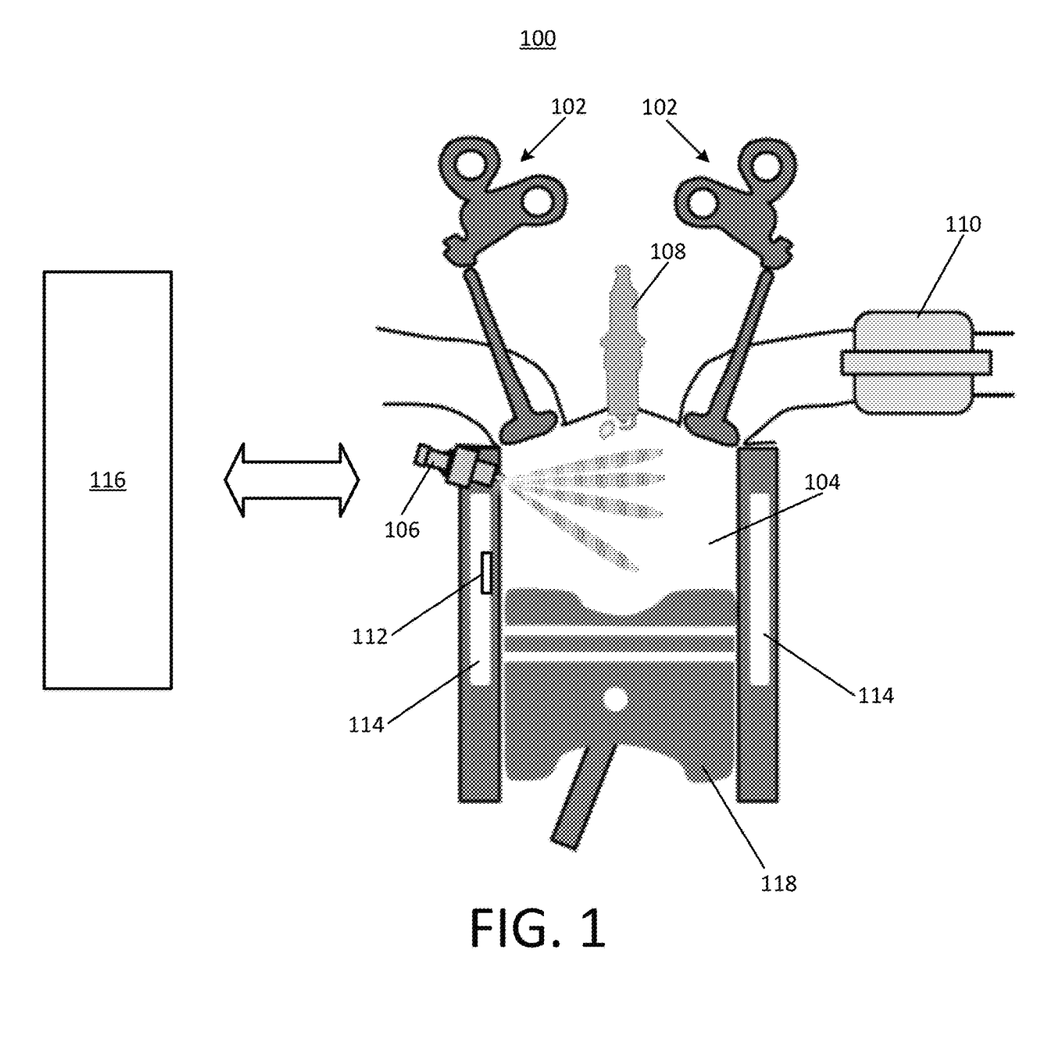
FIG. 1 illustrates an engine system configured to improve engine low load performance, according to an exemplary embodiment of the present disclosure.

Referring now to FIG. 1, an engine system 100 configured to improve engine low load performance is illustratively depicted, in accordance with an exemplary embodiment of the present disclosure.

According to an exemplary embodiment, the engine system 100 may comprise one or more dual continuously variable valve duration (CVVD) and continuously variable valve timing (CVVT) mechanisms 102 for intake and exhaust valve systems. According to an exemplary embodiment, a CVVD mechanism may configured to continuously vary a duration that an intake and/or exhaust valve remains open during one or more open-close cycles. According to an exemplary embodiment, a CVVT mechanism may configured to continuously vary the timing of when an intake and/or exhaust valve opens during one or more open-close cycles.

The engine system 100 may be an internal combustion engine system. According to an exemplary embodiment, the engine system 100 may comprise one or more combustion chambers 104, one or more pistons 118, one or more fuel delivery systems 106 (e.g., GDI systems and/or other suitable fuel delivery systems), one or more ignition systems 108, one or more aftertreatment monitoring systems 110 (e.g., one or more catalytic brick temperature monitoring systems and/or one or more other suitable aftertreatment monitoring systems), one or more engine coolant temperature sensors 112, and/or one or more water jackets 114, among other suitable components. According to an exemplary embodiment, the one or more engine coolant temperature sensors 112 may be coupled to one or more water jackets 114.

According to an exemplary embodiment, the engine system 100 may comprise an engine controller 116 configured to control one or more components and/or functions of the engine system 100. According to an exemplary embodiment, the engine controller 116 may be in electronic communication with one or more components of the engine system 100. The engine controller 116 may be in electronic communication with the one or more components of the engine system 100 via a wired and/or wireless connection such as, for example, through the cloud.

Figure 2:
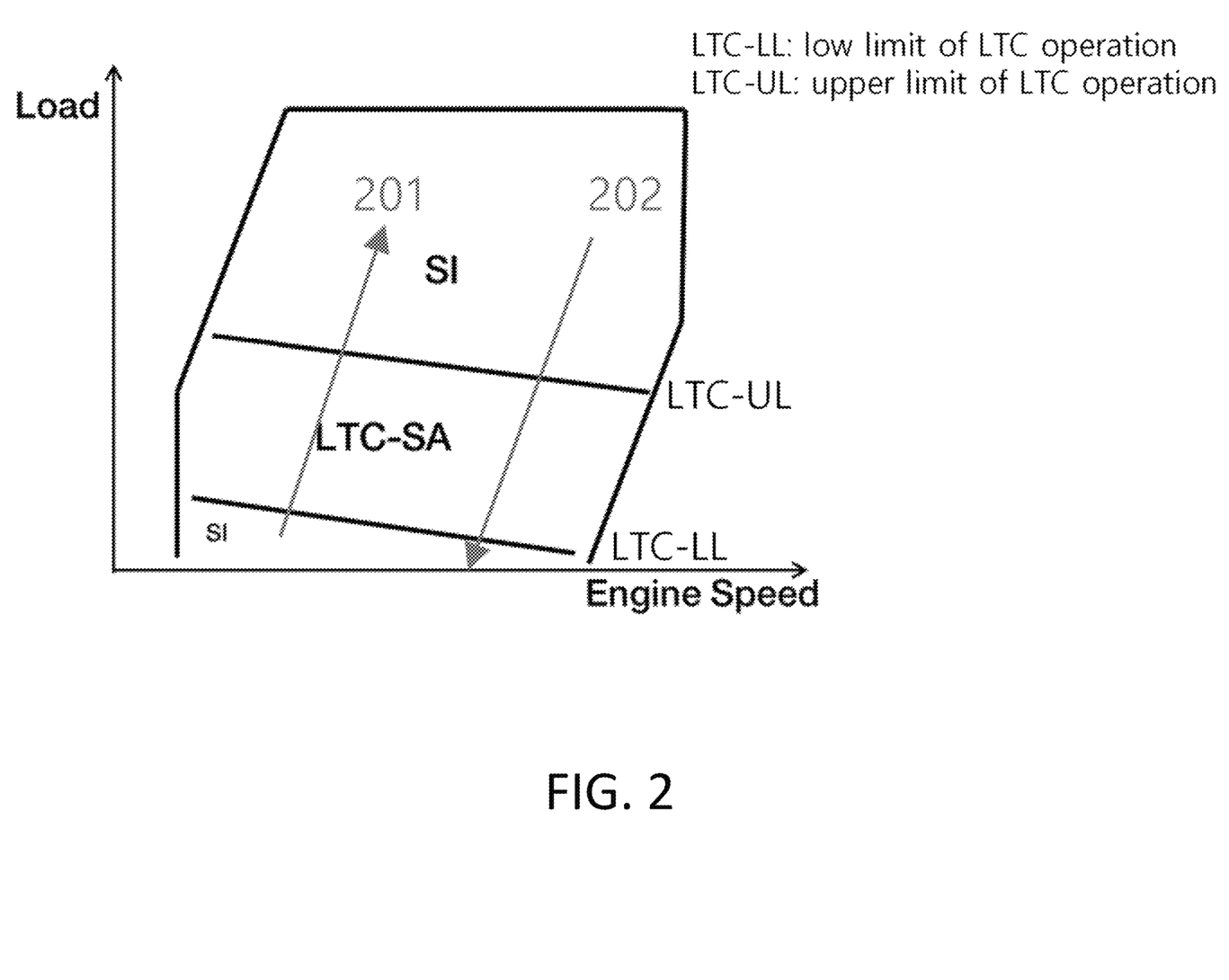
FIG. 2 illustrates a multimode combustion map, according to an exemplary embodiment of the present disclosure.

According to an exemplary embodiment, a low temperature combustion-spark assisted (LTC-SA) mode may be used for low to mid loads, and an SI mode for the remaining engine operations, according to a multimode combustion map such as shown, e.g., in FIG. 2.

Figure 3:
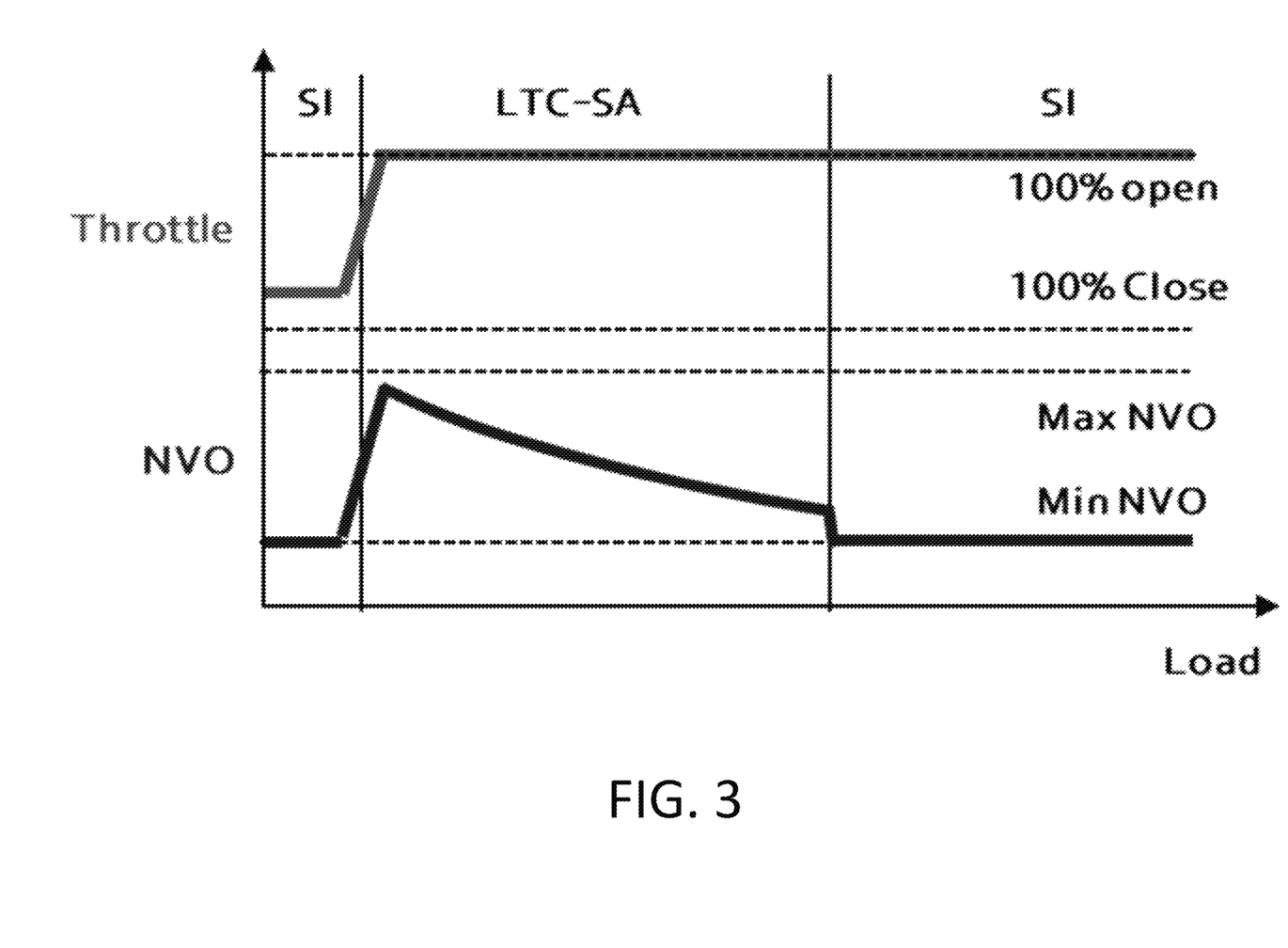
FIG. 3 illustrates a graphical representation of throttle and NVO of an engine system in different exemplary modes of operation, according to an exemplary embodiment of the present disclosure.

According to an exemplary embodiment, while in an LTC-SA mode, the NVO, enabled by the CVVD and CVVT and wide-open-throttle (WOT), may be used (as shown, e.g., in FIG. 3). According to an exemplary embodiment, the NVO may be configured to trap hot residuals in-cylinder and increase in-cylinder gas temperature before combustion, actively improving fuel vaporization, mixing, and reforming, to promote fuel-air mixture autoignition. According to an exemplary embodiment, the LTC-SA mode may be performed with some small throttling instead of wide open throttling.

According to an exemplary embodiment, spark assist may be used to ensure combustion stability and/or LTC may be used to have a fast combustion rate and low emissions.

According to an exemplary embodiment, WOT may be implemented to reduce pumping loss and/or fuel may be injected during NVO or/and during an intake stroke. According to an exemplary embodiment, the NVO amount may decrease as engine load increases and/or the NVO amount may be adjusted by simultaneously changing the IVO and EVC timings. According to an exemplary embodiment, the LTC mode may be performed without spark assist. According to an exemplary embodiment, instead of the LTC mode, an SI mode with a large NVO (e.g., greater than 50CAD) may be used at low loads. According to an exemplary embodiment, an SI mode with some NVO amount greater than a minimum NVO amount may be used. According to an exemplary embodiment, an SI mode with some PVO amount may be used.

According to an exemplary embodiment, based on engine speed and torque request and a rate of change, the engine may be operated in either the SI or LTC-SA mode. According to an exemplary embodiment, if the rate of change (ROC) in engine speed and load is not greater than the predefined ROC limit ($ROC_{max}$), that is, $ROC \leq ROC_{max}$, LTC-SA mode may be used for a range defined by LTC-UL and LTC-LL. Combustion mode switching is shown, e.g., in Table 2.

TABLE 2

| When ROC ≤ $ROC_{max}$ | 201 | 202 |
|---|---|---|
| SI to LTC-SA at LTC-LL | 1. Simultaneously and gradually increase NVO and open up throttle until WOT<br>2. Adjust spark timing and fueling. | — |
| LTC-SA to SI at LTC-UL | 1. Reduce NVO gradually until SI condition is met.<br>2. Increase boost as needed.<br>3. Adjust fueling and spark timing. | — |
| SI to LTC-SA at LTC-UL | — | 1. Gradually increase NVO.<br>2. Reduce boost as needed.<br>3. Adjust spark timing and fueling. |
| LTC-SA to SI at LTC-LL | — | 1. simultaneously and gradually decrease NVO and close throttle until SI condition is met.<br>2. Adjust spark timing and fueling. |

According to an exemplary embodiment, if the ROC is greater than the ROC, the engine mode transition may be operated in an SI mode for a faster engine response. After transition is complete, the final steady state operation mode may depend on the engine speed/load request, as shown in Table 3.

TABLE 3

| When ROC > $ROC_{max}$ | Current State: SI | Current State: LTC-SA |
|---|---|---|
| Final State: SI | 1. Adjust throttle and boost.<br>2. Adjust spark timing and fueling. | 1. Decrease NVO until SI condition is reached.<br>2. Adjust throttle and boost.<br>3. Adjust spark timing and fueling. |
| Final State: LTC-SA | 1. Adjust throttle and boost.<br>2. Adjust spark timing and fueling.<br>(3-5: mode switch at same speed/load)<br>3. Increase NVO until proper amount of NVO for LTC-SA is reached<br>4. If throttle is not fully open, simultaneously open up throttle | 1. Decrease NVO until SI condition is reached.<br>2. Adjust throttle and boost<br>3. Adjust spark timing and fueling.<br>(4-6: mode switch at same speed/load)<br>4. Increase NVO until proper amount of NVO for LTC-SA is reached |

TABLE 3-continued

| When ROC > ROC$_{max}$ Current State: SI | Current State: LTC-SA |
|---|---|
| until wide open when executing step 3.<br>5. Adjust boost, fueling and spark timing. | 5. If throttle is not fully open, simultaneously open up throttle until wide open when executing step 4.<br>6. Adjust boost, fueling and spark timing. |

According to an exemplary embodiment, the engine system 100 may comprise a dual CVVD and CVVT for the intake and exhaust valve systems, using NVO enabled by the CVVD and CVVT to be configured to perform wide-open-throttle operation at low loads to reduce pumping loss, and using NVO enabled by CVVD & CVVT to be configured to increase in-cylinder gas temperature before combustion, to actively improve fuel vaporization, mixing, and reforming, and to promote fuel-air mixture autoignition, that is, LTC, for a faster combustion rate.

According to an exemplary embodiment, the engine system 100 may be configured to simultaneously adjust the IVO and EVC along with the ROC$_{max}$ based transition method, to be able to perform fast mode switching. According to an exemplary embodiment, the engine system 100 may be configured to simultaneously adjust the IVO and EVC to be configured to perform fast load changes in the LTC mode.

Figure 4:
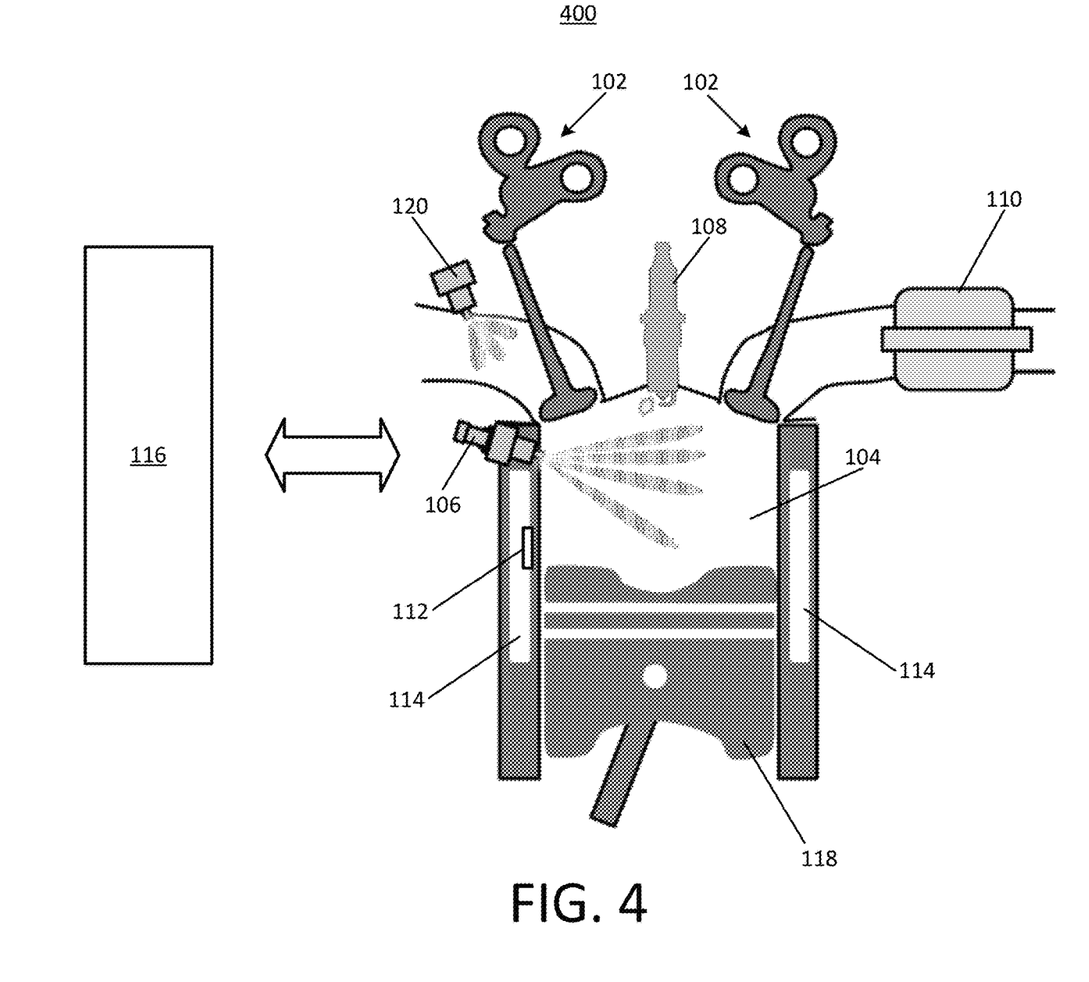
FIG. 4 illustrates an engine system configured to improve engine low load performance, according to an exemplary embodiment of the present disclosure.

Referring now to FIG. 4, an engine system 400 configured to improve engine low load performance is illustratively depicted, in accordance with an exemplary embodiment of the present disclosure.

The engine system 400 may be an internal combustion engine system. According to an exemplary embodiment, similar to engine system 100, the engine system 400 may comprise one or more dual CVVD and CVVT mechanisms 102 for the intake and exhaust valve systems, one or more combustion chambers 104, one or more pistons 118, one or more ignition systems 108, one or more aftertreatment monitoring systems 110 (e.g., one or more catalytic brick temperature monitoring systems and/or one or more other suitable aftertreatment monitoring systems), one or more engine coolant temperature sensors 112, and/or one or more water jackets 114, among other suitable components. According to an exemplary embodiment, the one or more engine coolant temperature sensors 112 may be coupled to one or more water jackets 114.

According to an exemplary embodiment, the engine system 400 may comprise an engine controller 116 configured to control one or more components and/or functions of the engine system 400. According to an exemplary embodiment, the engine controller 116 may be in electronic communication with one or more components of the engine system 400. The engine controller 116 may be in electronic communication with the one or more components of the engine system 400 via a wired and/or wireless connection such as, for example, through the cloud.

According to an exemplary embodiment, the engine system 400 may comprise one or more GDI systems 106 and/or one or more port fuel injection delivery systems 120. According to an exemplary embodiment, the engine system 400 may be configured to use the port fuel injection system 120 instead of direct fuel injection, or may be configured to use a combination of both, as shown, e.g., in FIG. 4.

According to an exemplary embodiment, the engine system (e.g., engine systems 100, 400) may be configured to run with a globally stoichiometric fuel-air ratio. According to an exemplary embodiment, the engine system may be configured to start without an NVO as a conventional SI engine, and then use an NVO mode during a warm-up period of the engine.

According to an exemplary embodiment, the engine system (e.g., engine systems 100, 400) may be configured to perform single fuel injection, which may start during the NVO, during an intake stroke (at or after IVO), or during a compression stroke (at/after IVC). According to an exemplary embodiment, the engine system may be configured to perform double fuel injection with both injections starting during the NVO or both after NVO. According to an exemplary embodiment, the engine system may be configured to perform triple fuel injection, with one injection during NVO, a second injection after IVO but before firing top dead center, and the 3rd injection aTDCf.

Figure 5:
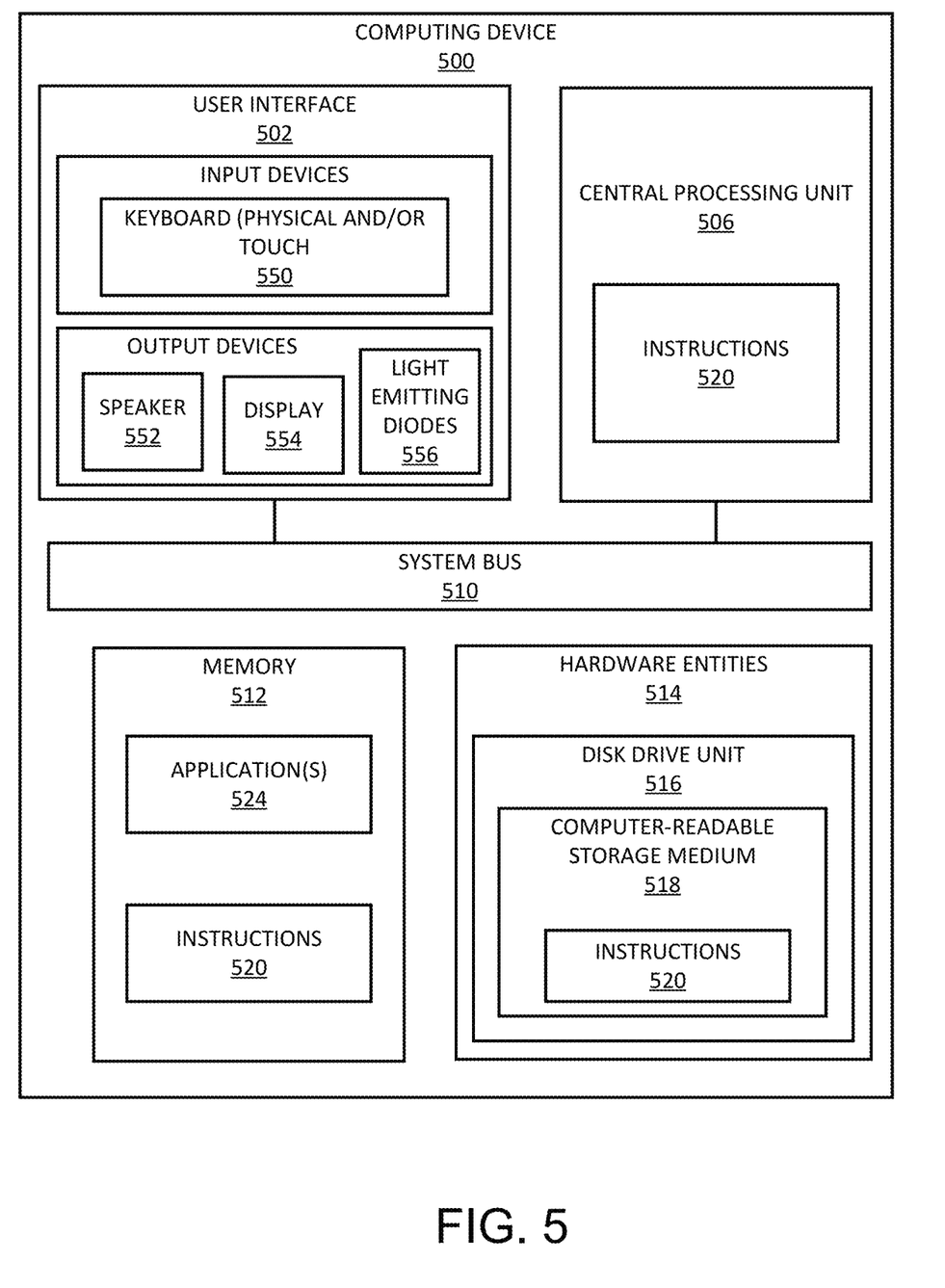
FIG. 5 illustrates example elements of a computing device, according to an exemplary embodiment of the present disclosure.

Referring now to FIG. 5, an illustration of an example architecture for a computing device 500 is provided. According to an exemplary embodiment, one or more functions of the present disclosure may be implemented by a computing device such as, e.g., computing device 500 or a computing device similar to computing device 500.

The hardware architecture of FIG. 5 represents one example implementation of a representative computing device configured to perform one or more methods and means for improving engine low load performance, as described herein. As such, the computing device 500 of FIG. 5 may be configured to implement at least a portion of the method(s) described herein (e.g., the steps shown in Table 2 and Table 3) and/or implement at least a portion of the functions of the system(s) described herein (e.g., engine system 100 of FIG. 1 and engine system 400 of FIG. 4).

Some or all components of the computing device 500 may be implemented as hardware, software, and/or a combination of hardware and software. The hardware may comprise, but is not limited to, one or more electronic circuits. The electronic circuits may comprise, but are not limited to, passive components (e.g., resistors and capacitors) and/or active components (e.g., amplifiers and/or microprocessors). The passive and/or active components may be adapted to, arranged to, and/or programmed to perform one or more of the methodologies, procedures, or functions described herein.

As shown in FIG. 5, the computing device 500 may comprise a user interface 502, a Central Processing Unit ("CPU") 506, a system bus 510, a memory 512 connected to and accessible by other portions of computing device 500 through system bus 510, and hardware entities 514 connected to system bus 510. The user interface may comprise input devices and output devices, which may be configured to facilitate user-software interactions for controlling operations of the computing device 500. The input devices may comprise, but are not limited to, a physical and/or touch keyboard 540. The input devices may be connected to the computing device 500 via a wired or wireless connection (e.g., a Bluetooth® connection). The output devices may comprise, but are not limited to, a speaker 542, a display 544, and/or light emitting diodes 546.

At least some of the hardware entities 514 may be configured to perform actions involving access to and use of memory 512, which may be a Random Access Memory (RAM), a disk driver and/or a Compact Disc Read Only Memory (CD-ROM), among other suitable memory types. Hardware entities 514 may comprise a disk drive unit 516 comprising a computer-readable storage medium 518 on which may be stored one or more sets of instructions 520 (e.g., programming instructions such as, but not limited to, software code) configured to implement one or more of the methodologies, procedures, or functions described herein. The instructions 520 may also reside, completely or at least partially, within the memory 512 and/or within the CPU 506 during execution thereof by the computing device 500.

The memory 512 and the CPU 506 may also constitute machine-readable media. The term "machine-readable media", as used here, refers to a single medium or multiple media (e.g., a centralized or distributed database, and/or associated caches and servers) that store the one or more sets of instructions 520. The term "machine-readable media", as used here, also refers to any medium that is capable of storing, encoding, or carrying a set of instructions 520 for execution by the computing device 500 and that cause the computing device 500 to perform any one or more of the methodologies of the present disclosure.

Figure 6:
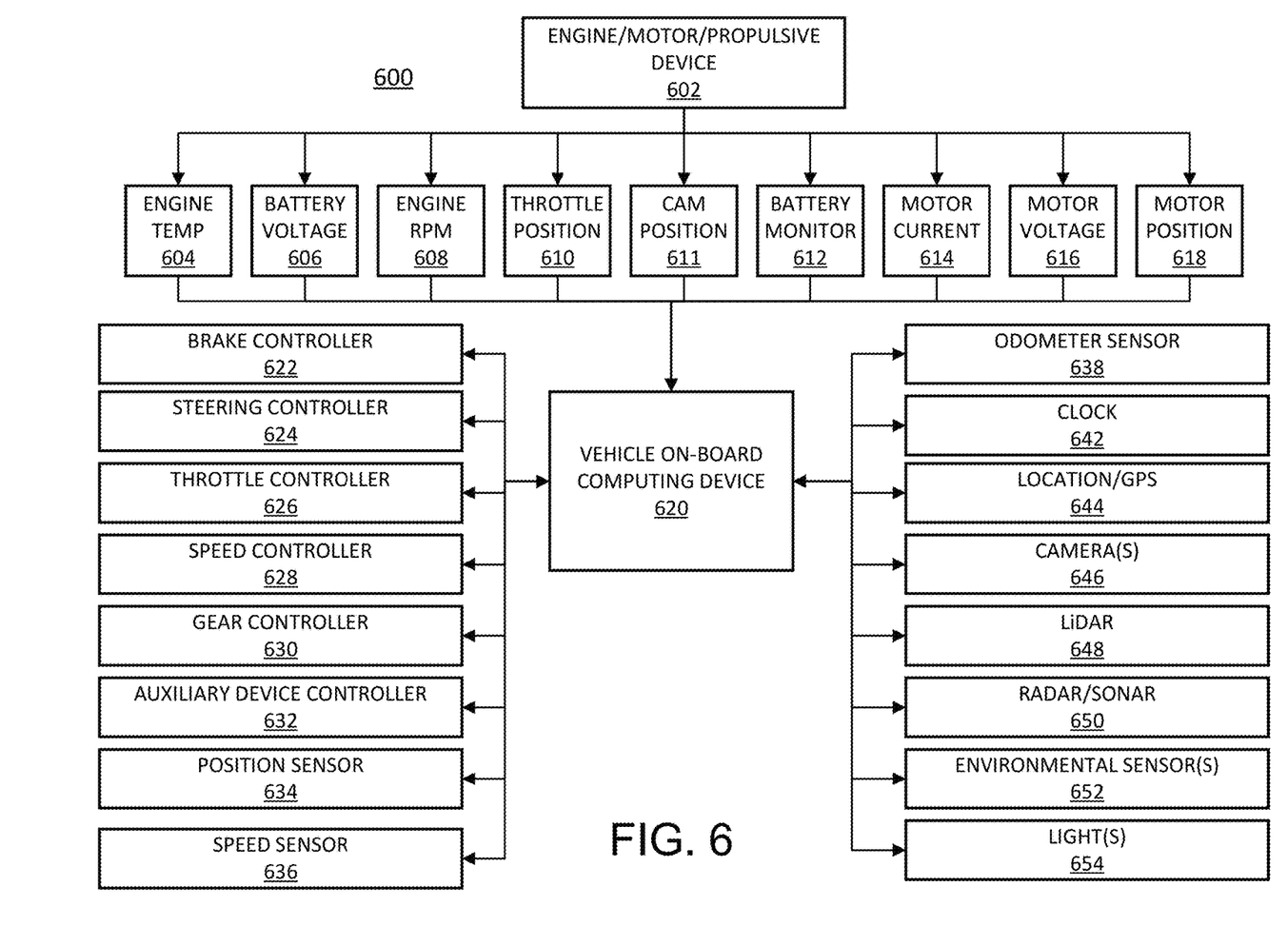
FIG. 6 illustrates an example architecture of a vehicle, according to an exemplary embodiment of the present disclosure.

Referring now to FIG. 6, an example vehicle system architecture 600 for a vehicle is provided, in accordance with an exemplary embodiment of the present disclosure.

Engine system 100 and engine system 400 may be configured to be incorporated in or with a vehicle having the same or similar system architecture as that shown in FIG. 6. Thus, the following discussion of vehicle system architecture 600 is sufficient for understanding one or more components of a vehicle with which engine systems 100 and 400 may be incorporated.

As shown in FIG. 6, the vehicle system architecture 600 may comprise an engine, motor or propulsive device (e.g., a thruster) 602 and various sensors 604-618 for measuring various parameters of the vehicle system architecture 600. In gas-powered or hybrid vehicles having a fuel-powered engine, the sensors 604-618 may comprise, for example, an engine temperature sensor 604, a battery voltage sensor 606, an engine Rotations Per Minute (RPM) sensor 608, and/or a throttle position sensor 610, and a cam position sensor 611. If the vehicle is an electric or hybrid vehicle, then the vehicle may comprise an electric motor, and accordingly may comprise sensors such as a battery monitoring system 612 (to measure current, voltage and/or temperature of the battery), motor current 614 and voltage 616 sensors, and motor position sensors such as resolvers and encoders 618.

Operational parameter sensors that are common to both types of vehicles may comprise, for example: a position sensor 634 such as an accelerometer, gyroscope and/or inertial measurement unit; a speed sensor 636; and/or an odometer sensor 638. The vehicle system architecture 600 also may comprise a clock 642 that the system uses to determine vehicle time and/or date during operation. The clock 642 may be encoded into the vehicle on-board computing device 620, it may be a separate device, or multiple clocks may be available.

The vehicle system architecture 600 also may comprise various sensors that operate to gather information about the environment in which the vehicle is traveling. These sensors may comprise, for example: a location sensor 644 (for example, a Global Positioning System (GPS) device); object detection sensors such as one or more cameras 646; a LiDAR sensor system 648; and/or a RADAR and/or a sonar system 650. The sensors also may comprise environmental sensors 652 such as, e.g., a humidity sensor, a precipitation sensor, a light sensor, and/or ambient temperature sensor. The object detection sensors may be configured to enable the vehicle system architecture 600 to detect objects that are within a given distance range of the vehicle in any direction, while the environmental sensors 652 may be configured to collect data about environmental conditions within the vehicle's area of travel. According to an exemplary embodiment, the vehicle system architecture 600 may comprise one or more lights 654 (e.g., headlights, flood lights, flashlights, etc.).

During operations, information may be communicated from the sensors to an on-board computing device 620 (e.g., computing device 500 of FIG. 5). The on-board computing device 620 may be configured to analyze the data captured by the sensors and/or data received from data providers and may be configured to optionally control operations of the vehicle system architecture 600 based on results of the analysis. For example, the on-board computing device 620 may be configured to control: braking via a brake controller 622; direction via a steering controller 624; speed and acceleration via a throttle controller 626 (in a gas-powered vehicle) or a motor speed controller 628 (such as a current level controller in an electric vehicle); a differential gear controller 630 (in vehicles with transmissions); and/or other controllers. The brake controller 622 may comprise a pedal effort sensor, pedal effort sensor, and/or simulator temperature sensor, as described herein.

Geographic location information may be communicated from the location sensor 644 to the on-board computing device 620, which may then access a map of the environment that corresponds to the location information to determine known fixed features of the environment such as streets, buildings, stop signs and/or stop/go signals. Captured images from the cameras 646 and/or object detection information captured from sensors such as LiDAR 648 may be communicated from those sensors to the on-board computing device 620. The object detection information and/or captured images may be processed by the on-board computing device 620 to detect objects in proximity to the vehicle. Any known or to be known technique for making an object detection based on sensor data and/or captured images may be used in the embodiments disclosed in this document.

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

In particular and in regard to the various functions performed by the above described components, devices, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

The aforementioned systems and components have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components. Any components described herein may also interact with one or more other components not specifically described herein.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including." "has," "contains," variants thereof, and other similar words are used in either the detailed description or the claims, these terms are intended to be inclusive in a manner similar to the term "comprising" as an open transition word without precluding any additional or other elements.

Thus, the embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed is:

1. A method of improving engine low load performance, comprising:
    performing a negative valve overlap (NVO) mode of operation, using an early exhaust valve closing (EVC) timing that is earlier than an intake valve opening (IVO) timing and creates an NVO during a gas exchange top dead center, to compress in-cylinder gas and increase overall gas temperature for improved fuel vaporization, mixing, and reforming before a fuel-air mixture is burnt;
    running an engine in a low temperature combustion-spark assisted (LTC-SA) mode with an approximately wide-open-throttle (WOT); and
    when a rate of change (ROC) in the engine speed and a load is less than or equal to a predefined ROC (ROCmax):
        transitioning from a spark ignition (SI) mode to an LTC-SA mode; or
        transitioning from the LTC-SA mode to the SI mode; and
    when the ROC is greater than the ROCmax:
        when in the SI mode:
            adjusting a throttle and a boost; and
            adjusting a spark timing and a fueling strategy.

2. The method of claim 1, wherein the transitioning from the SI mode to the LTC-SA mode comprises:
    when at a low limit of LTC operation:
        simultaneously and gradually increasing the NVO until the approximately wide-open-throttle (WOT) is achieved; and
        adjusting the spark timing and the fueling strategy.

3. The method of claim 1, wherein the transitioning from the LTC-SA mode to the SI mode comprises:
    when at an upper limit of LTC operation:
        reducing the NVO gradually to a proper cam setting for SI operation;
        increasing the boost as needed; and
        adjusting the spark timing and the fueling strategy.

4. The method of claim 1, wherein the transitioning from the SI mode to the LTC-SA mode comprises:
    when at an upper limit of LTC operation:
        gradually increasing the NVO until an LTC-SA condition is achieved;
        reducing the boost as needed; and
        adjusting the spark timing and the fueling strategy.

5. The method of claim 1, wherein the transitioning from the LTC-SA mode to the SI mode comprises:
    when at a low limit of LTC operation:
        simultaneously and gradually decreasing the NVO and closing the throttle until an SI condition is met; and
        adjusting the spark timing and the fueling strategy.

6. The method of claim 1, further comprising, when the ROC is greater than the ROCmax:
    when in the SI mode, adjusting the engine speed and the load by maintaining in the SI mode, and then transitioning to the LTC-SA mode by:
        increasing the NVO to an NVO value suitable for use with the LTC-SA mode;
        when the throttle is not fully open, simultaneously opening up the throttle until the approximately wide-open-throttle (WOT) is achieved; and
        adjusting the spark timing and the fueling strategy.

7. The method of claim 1, further comprising, when the ROC is greater than the ROCmax:
    when in the LTC-SA mode:
        decreasing the NVO until a cam setting for the SI mode is reached;
        adjusting the engine speed and the load by adjusting the throttle, the boost, the spark timing and the fueling;
        increasing the NVO to an NVO value suitable for use with the LTC-SA mode;
        when the throttle is not fully open, simultaneously opening up the throttle until the approximately wide-open-throttle (WOT) is achieved; and
        adjusting the spark timing and the fueling strategy.

8. The method of claim 1, further comprising, when the ROC is greater than the ROCmax:
    when in the LTC-SA mode, transitioning to the SI mode by:
        decreasing the NVO until a proper cam setting for the SI mode is reached;
        adjusting the throttle and the boost; and
        adjusting the spark timing and the fueling strategy.

* * * * *